United States Patent
Hazan (10) Patent No.: US 12,427,665 B2
(45) Date of Patent: Sep. 30, 2025

(54) METHOD AND SYSTEM FOR AUTOMATICALLY DETERMINING A MOTION DATA SAMPLE OF A GIVEN ROBOT AND ITS SURROUNDING OBJECT SET

(71) Applicant: Siemens Industry Software Ltd., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 282 days.

(21) Appl. No.: 18/023,430

(22) PCT Filed: Aug. 25, 2020

(86) PCT No.: PCT/IB2020/057919
§ 371 (c)(1),
(2) Date: Feb. 27, 2023

(87) PCT Pub. No.: WO2022/043732
PCT Pub. Date: Mar. 3, 2022

(65) Prior Publication Data
US 2023/0311324 A1    Oct. 5, 2023

(51) Int. Cl.
*B25J 9/16* (2006.01)
(52) U.S. Cl.
CPC .................. *B25J 9/1671* (2013.01)
(58) Field of Classification Search
CPC ......... B25J 9/1671; G05B 2219/39101; G05B 2219/40515
See application file for complete search history.

(56) References Cited

U.S. PATENT DOCUMENTS

| | | | |
|---|---|---|---|
| 2008/0114492 A1* | 5/2008 | Miegel | B25J 9/1664 901/6 |
| 2012/0166165 A1* | 6/2012 | Nogami | B25J 9/1671 703/6 |
| 2015/0190926 A1 | 7/2015 | Miegel et al. | |
| 2017/0091999 A1 | 3/2017 | Blumenfeld et al. | |
| 2017/0139407 A1* | 5/2017 | Sakaguchi | B25J 9/1697 |
| 2018/0161987 A1 | 6/2018 | Linnell | |
| 2019/0084151 A1 | 3/2019 | Bai et al. | |

(Continued)

*Primary Examiner* — Ryan Rink
(74) *Attorney, Agent, or Firm* — Laurence A. Greenberg; Werner H. Stemer; Ralph E. Locher (57) ABSTRACT

Systems and methods determining motion data samples of robots and surrounding object sets displaying robotic tasks within a virtual environment portion include accessing a virtual simulation system simulating robotic tasks interacting with object sets within the virtual environment. The system receives virtual data inputs on the environment including robots and object sets. Instruction sets representing robotic tasks and resulting data of a simulation of robotic tasks and object sets is received and sampled at sampling times until performing iterations. Sampled position data of robots and object sets are collected at sampling times. A robotic relation group includes the robot, objects in the environment portion and time stamps. A virtual camera point of view displays the robot and object set. The robot and object set are on collected sampled position data at time stamps and motion data samples are determined by recording their motion data sample at the point of view.

9 Claims, 6 Drawing Sheets

(56) References Cited

U.S. PATENT DOCUMENTS

| | | | |
|---|---|---|---|
| 2020/0290204 A1* | 9/2020 | Hirabayashi | B25J 13/089 |
| 2021/0037214 A1* | 2/2021 | Itoh | B25J 5/005 |
| 2021/0252713 A1* | 8/2021 | Mimura | G06F 3/0416 |

* cited by examiner

FIG 2

| FIG 2A | FIG 2B |

FIG 2A

```
□ 30R01_DISP_TRIAL_PROGRAMS.mod ⊠
115  CONST robtarget pnzl_17040_02_050 sl:=
116  CONST robtarget pnzl_17040_02_055 sl:=
117  CONST robtarget pnzl_17040_02_060 sl:=
118  CONST robtarget pnzl_17040_02_065 sl:=
119  CONST robtarget pnzl_17040_02_070 sl:=
120  CONST robtarget pnzl_17040_02off:=
121  CONST robtarget pnzl_17040_02on:=
122  CONST robtarget pnzl_17040_03_005 sl:=
123  CONST robtarget pnzl_17040_03_010 sl:=
124  CONST robtarget pnzl_17040_03_015 sl:=
125  CONST robtarget pnzl_17040_03_020 sl:=
126  CONST robtarget pnzl_17040_03_025 sl:=
127  CONST robtarget pnzl_17040_03off:=
128  CONST robtarget pnzl_17040_03on:=
129  CONST robtarget pnzl_17040_04_005 sl:=
130  CONST robtarget pnzl_17040_04_010 sl:=
131  CONST robtarget pnzl_17040_04_015 sl:=
132  CONST robtarget pnzl_17040_04_020 sl:=
133  CONST robtarget pnzl_17040_04_025 sl:=
134  CONST robtarget pnzl_17040_04_030 sl:=
135  CONST robtarget pnzl_17040_04_035 sl:=
136  CONST robtarget pnzl_17040_04_040 sl:=
137  CONST robtarget pnzl_17040_04_045 sl:=
138  CONST robtarget pnzl_17040_04_050 sl:=
139  CONST robtarget pnzl_17040_04_055 sl:=
```

METHOD AND SYSTEM FOR AUTOMATICALLY DETERMINING A MOTION DATA SAMPLE OF A GIVEN ROBOT AND ITS SURROUNDING OBJECT SET

FIELD AND BACKGROUND OF THE INVENTION

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

In industrial manufacturing, robotic cells of certain production facilities may be complex and densely populated with several diverse industrial objects and equipment pieces.

Examples of the diverse industrial objects and equipment pieces present in densely populated robotic cells typically include, but are not limited by, industrial robots, robotic tools like guns and grippers, conveyors, turntables, product parts and/or other objects and equipment pieces which may dynamically interact with each other, often in a parallel manner.

During manufacturing operations, the various robotic tasks performed by each physical robot depend from PLC signals which in turn typically depend on sensors and/or on the activities of other robots within the cell.

During manufacturing operations, each physical robot executes its robotic tasks by running on its own robotic controller one or more robotic programs assigned to it.

A robotic program can be seen as container of robotic program instructions, like for example target locations along the robot trajectory which for example may be given as a sequence of 3 dimensional ("3D") frame coordinates e.g. (X, Y, Z, $R_X$, $R_Y$, $R_Z$) together with corresponding robotic motion instructions (e.g. speed, acceleration, configuration etc.) and Off-Line Programming (OLP) commands.

The codes of such robotic programs are usually written in a robotic programming language, usually a native language of a specific robot's vendor and model. Examples of such native robotic language include, but are not limited by, native robotic language supported by robot' vendors like KUKA, ABB, Fanuc etc.

Hence, the code inside a robotic program file usually comprises a long and complex list of 3D numeric target locations along the robotic trajectory together with motion instruction and OLP commands. It is noted that the robotic program code file typically does not include data on the robotic tools, on the pieces of equipment and on the product parts which are located in the proximity of the robot within the cell. In cases, the robotic program file can include the index of the desired robotic gun, for example "use gun number 5" so that the robot uses this gun coordinates (X, Y, Z, $R_X$, $R_Y$, $R_Z$) for the robot inverse calculation. However, even in such cases, the robotic program file does not include any other useful information about the robotic gun.

Figure 2:
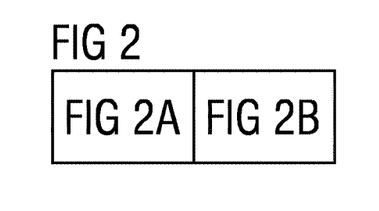
FIG. 2 is a drawing schematically illustrating a screenshot of a portion of a robotic program code.
Figure 2A:
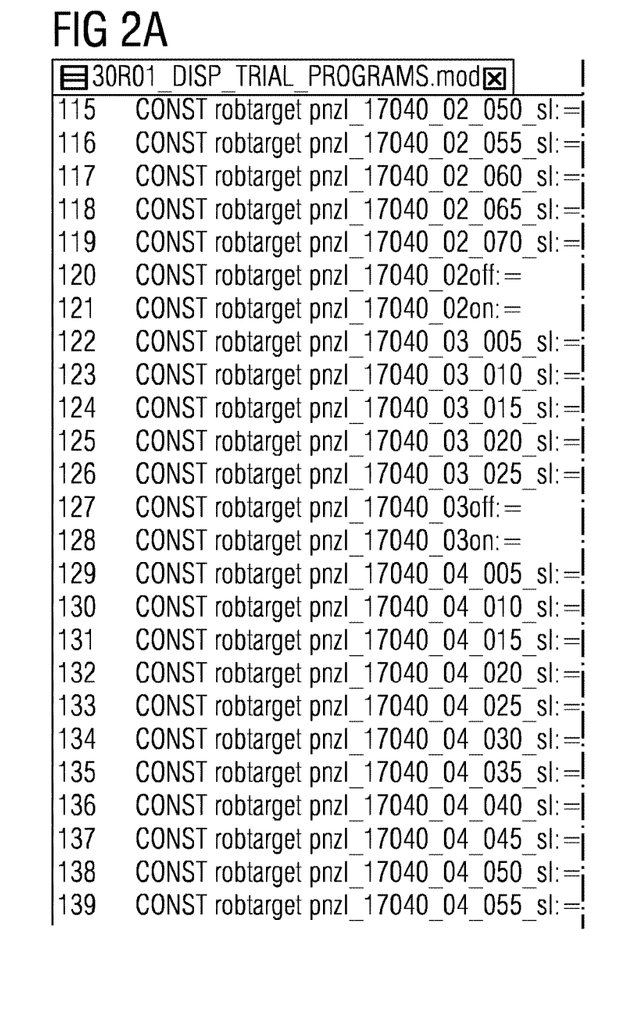

FIG. 2 is a drawing schematically illustrating a screenshot of a portion of a robotic program code. As seen in FIG. 2, the screenshot 200 includes a long and complex list of robot target locations and robotic instructions.

Skilled industrial design engineers are somehow accustomed to "read" into such robotic program files and they typically rely on conventions of file names in order to distinguish which specific robot is involved and what its performed robotic job is.

For example, each robotic program file name may conventionally include a study name, a robotic identifier, a production version and a robotic task description "Cell-1_Robot-A_Sport-Car_Welding-op_.mod". Additionally, other characterizing textual descriptions are typically included, in a comment format, inside the program file, e.g. creation date, facility name, creator name.

Industrial design engineers often re-use old robotic programs in a partial or full manner when designing robot operations of a new or an upgraded robotic cell of a manufacturing facility line.

It is however clear that, since a complex and "crowded" facility cell can be in charge of producing several product part variants over a time span of months and years, it is impracticable for industrial users to solely rely on a textual type of information to distinguish among hundreds of robotic programs and associate corresponding robotic tasks executed by specific robots.

In order to design new robotic programs by reusing old robotic programs, for example by enhancement them so as to produce new product variant model of a new production season, industrial engineers need to first be able to identify and associate robotic tasks to robotic programs by understanding which old robotic program does "what, where and how".

As above explained, in the art, in order to distinguish among robotic tasks of robots within a cell, users have been mainly relying on textual descriptions associated to the given robotic program of a corresponding specific robot.

Another technique employed by users consists in loading a given robotic program in a teach pendant control box. By doing so, users are yes able to display the specific robot motion within a 3D space, however the robotic tools, the equipment pieces and the product parts surrounding the specific robot are unfortunately missing.

Another technique employed by users consists in loading the given robotic program in a virtual cell of a virtual simulation environment and quickly running it, though without executing the full simulation with all environmental signals like e.g. in a virtual commissioning system. By doing so, users are yes able to display the specific robot moving in its cell, however the influence from the robot's surrounding environment is still unfortunately missing. Moreover, with this technique, users need to be provided with access rights to a virtual simulation software application and need to be provided the virtual study of the corresponding robotic cell.

Another technique employed by users consists in loading the given robotic program in a virtual cell of a industrial virtual simulation environment and executing the full simulation with all environmental cell signals. By doing so, users are yes able to see the specific robot moving in its cell, however users need to be provided with access rights to a virtual simulation software application, they need to be provided with the virtual study of the corresponding robotic cell and, most importantly, they need to wait dozen of minutes until the full simulation has completed its execution.

Software applications for industrial virtual simulation are platforms able to simulate the robotic tasks of the cell robots by running their robotic programs within the virtual cell environment, preferably including all cell's signals and PLCs.

Examples of industrial virtual simulation software applications and platforms include, but are not limited by, Computer Assisted Robotic ("CAR") tools, Process Simulate (a product of Siemens Industry Software suite), Virtual Robot Controllers ("VRC") and any other virtual systems for capable of executing robotic commands for industrial robotic simulations.

Such industrial software application are usually complex and expensive platforms, which require hardware resources, access rights, software licenses and they are mostly not available at the shop floor.

Hence, in a common industrial scenario not all manufacturing personnel have access to such industrial virtual simulation software applications and, if yes, surely not all manufacturing personnel would be able to access such applications on an ongoing basis.

In any case, it would not be a viable solution to run a full robotic cell industrial simulation each time an industrial user needs to identify robotic programs and/or robotic tasks executed by one or more robots of one or more robotic cells.

Examples of virtual environments include, but are not limited by, a virtual facility, a virtual plant, virtual production line, a virtual study, a virtual robotic cell, a virtual work cell, a virtual production line and any other selected portions of a virtual production plant.

As seen, current techniques for dynamically displaying a robotic task of a specific robot within a virtual environment or within a robotic cell are cumbersome, tedious, error-prone, and otherwise ill-suited for the task.

SUMMARY OF THE INVENTION

Improved techniques for automatically determining a sample of robotic motion data for dynamically displaying a robotic task of a specific robot within a robotic environment or within a cell are desirable.".

Various disclosed embodiments include methods, systems, and computer readable mediums for automatically determining a motion data sample of a given robot and its surrounding object set for dynamically displaying a robotic task of the given robot within its portion of a virtual environment. The virtual environment comprises a plurality of robots and a corresponding plurality of industrial object sets. A method includes providing access to a virtual simulation system capable of simulating a plurality of robotic tasks of the plurality of robots interacting with their corresponding object sets within the virtual environment. The method further includes receiving, by the virtual simulation system, virtual data inputs on the virtual environment including its plurality of virtual robots and corresponding plurality of virtual object sets. The method further includes, for each given robot, receiving, c) by the virtual simulation system, input data on one or more robotic instruction sets representing one or more corresponding robotic tasks. The method further includes receiving, from the virtual simulation system, resulting data of a simulation of all the robotic tasks of the plurality of robots and of all the plurality object sets; where the resulting simulation data are sampled at defined sampling times $t_i$ until at least each robot performed at least one iteration. The method further includes collecting, from the received resulting simulation data, sampled position data of one or more robots and of corresponding one or more object sets at the defined sampling times $t_i$. The method further includes defining, for at least one given robot, a given robotic relation group including the given robot and a set of corresponding surrounding objects in the robot's own virtual environment portion and relevant time stamps. The method further includes defining a given virtual camera point of view suitable for dynamically displaying the given robot and the object set of the given robotic relation group. The method further includes placing, within the virtual simulation system, the given robot and the object set of the given related robotic group on their corresponding collected sampled position data at their relevant time stamps; and, determining their corresponding motion data sample by recording their motion data sample at the virtual camera point of view.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE FIGURES

For a more complete understanding of the present disclosure, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for automatically determining a motion data sample of a given robot require too much time and effort. The embodiments disclosed herein provide numerous technical benefits, including but not limited to the following examples.

Embodiments advantageously enable to automatically determine a sample of robotic motion data for dynamically displaying a robotic task of a specific robot within a robotic cell, departing from robotic task data and virtual robotic cell data.

Embodiments advantageously enable to automatically determine sample robotic motion data for dynamically and efficiently displaying a robotic task of a specific robot within a robotic environment or cell.

Embodiments conveniently enable to automatic generating a preview video for each desired robotic program by executing only once a full simulation of a robotic cell.

Embodiments advantageously enable to generate robotic tasks and programs "preview" videos in widely used file formats which can be easily and independently viewed by viewers without the need of ad-hoc software programs.

Embodiments enable to automatically generate a quality preview for each robotic task or robotic program source file.

With embodiments, a robotic preview video is generated automatically without requiring editing interventions by users.

With embodiments, generated robotic preview videos are optimized to display essential robotic task data, preferably by means of videos which are short and corresponding video files which are light.

With the embodiments, generated robotic preview videos are optimized to be user friendly in that only the few relevant industrial objects around the robot are displayed so as to obtain for users a «clean» display view. Advantageously, users are not "distracted" by a large number of unnecessary industrial objects.

Embodiments enable to provide each robotic program with its corresponding preview video. Such preview video is user friendly dramatically improves the user readability of a corresponding robotic program execution file.

With embodiments, upon request, robotic simulation software applications are advantageously enabled to deliver as results not only the robotic programs to be downloaded into their robotic controllers but also their corresponding robotic program preview videos.

With embodiments, a "digital twin" of each robotic program is provided in a short preview video format which preferably comprise a dynamic display of the robot motion with its kinematic including only its relevant surrounding equipment pieces and product part(s).

Advantageously, with embodiments, users may be assisted in their engineering tasks via robotic task preview screens providing a guided human-machine interaction process.

Embodiments enable ongoing assistance to engineers and line managers in their programming or controlling tasks by being guided and supported in a human-machine interactive manner.

In embodiments, as the line engineer designs the robotic tasks of robots of a robotic cell, corresponding preview videos assist the line engineer in her/his designing activities by provide a visual reflection of the robotic tasks.

Embodiments, inter alia, save engineering time and efforts.

Embodiments improve the usability of industrial robotic equipment usage and planning, also for inexperienced users.

Embodiments assist users in understanding the functionality of each robotic program with a fast and accurate preview, without wasting time and efforts.

Embodiments enable a quick ramp up for users who are advantageously enabled to catch the main task of each robot and robotic task and program in very crowded cells of complex facilities.

Figure 1:
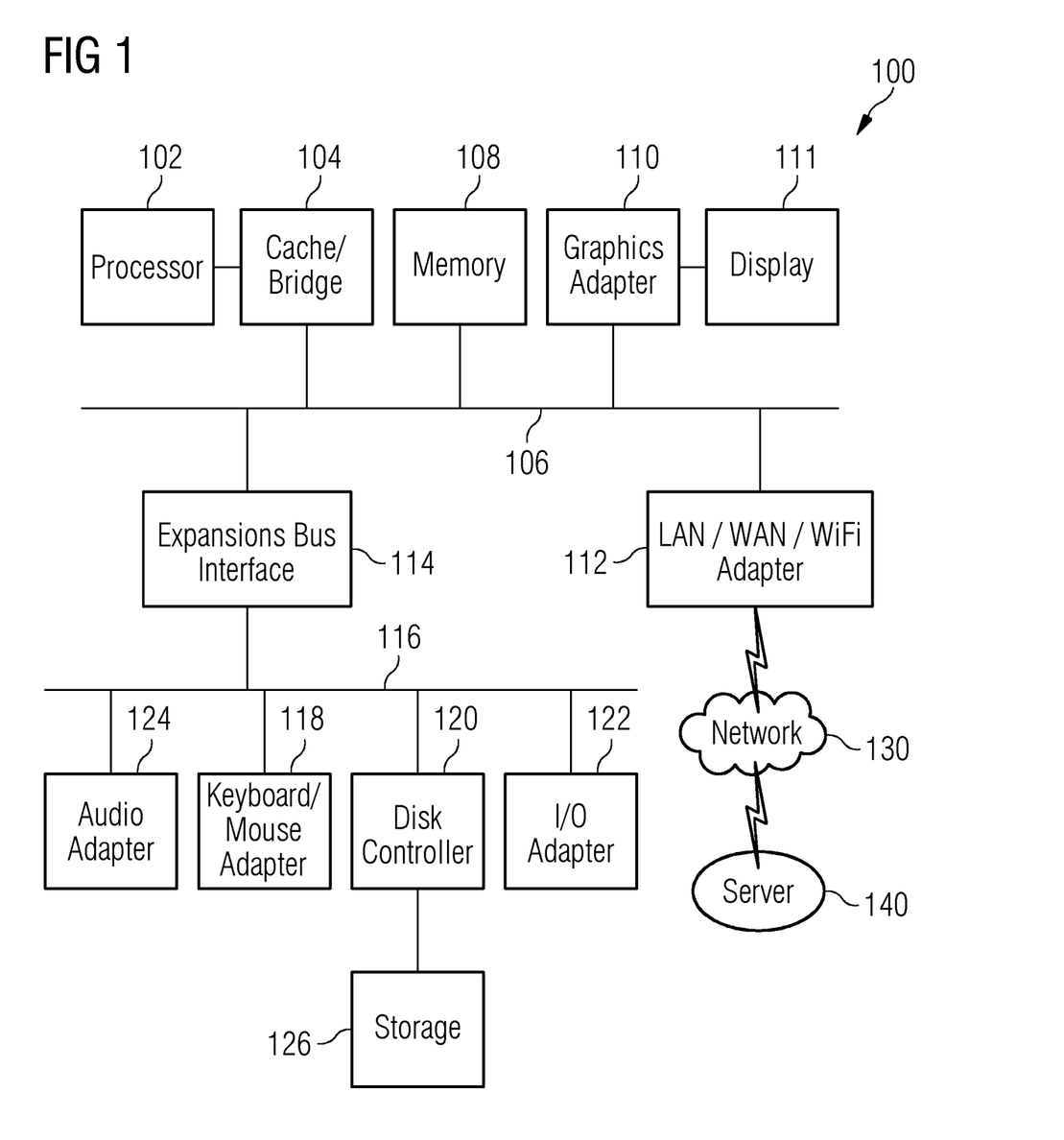
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Algorithm of an Exemplary Embodiment

In an exemplary embodiment, the main algorithm steps for determining sampled motion data for dynamically displaying a robotic task of a given robot with its object set within its portion of robotic cell are illustrated below.

Figure 3:
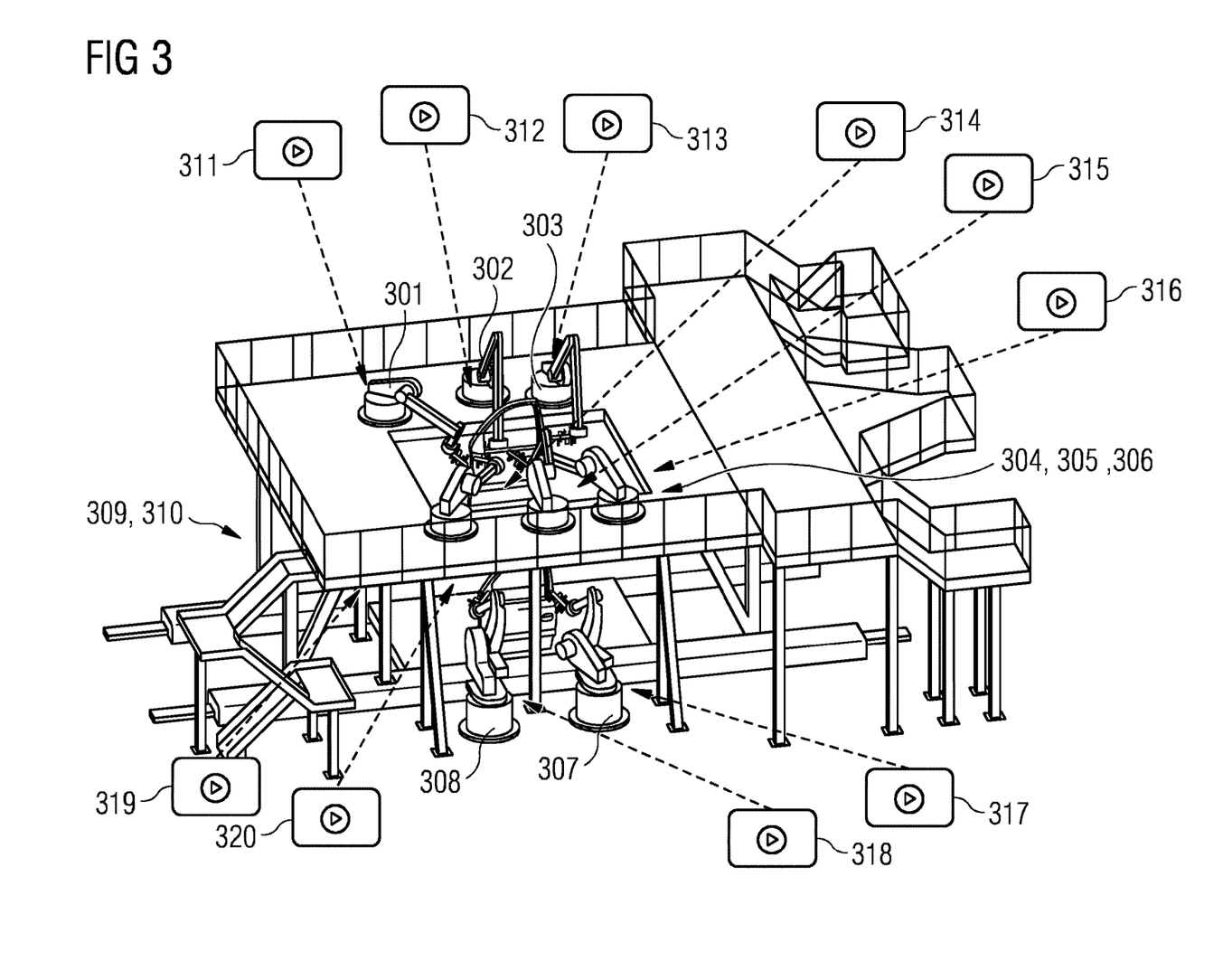
FIG. 3 is a drawing schematically illustrating a robotic cell in accordance with disclosed embodiments.

Assume, for illustration purposes, that this exemplary embodiment refers to the scenario of FIG. 3 where a robotic cell with ten robots 301-310 and related object sets are shown. FIG. 3 is a drawing schematically illustrating a robotic cell 300 in accordance with disclosed embodiments.

The exemplary embodiments disclosed herein are not limited to ten robots 301-310; other embodiments are contemplated.

The main algorithm steps are listed below; whereby some of the below steps/sub-steps illustrated in this example embodiment may be optional.

1) Loading the virtual study of the robotic cell into a virtual simulation application. The robotic cell includes the ten robots and ten related object sets. The object set related to a specific robot usually includes a minimal set of equipment pieces relevant for the specific robot, for example the robot's gun or grip and some equipment nearby and product parts etc.

2) For each robot, loading a corresponding robotic program instruction set. Examples of sources for robotic program instruction sets include, but are not limited by, a physical robotic program, a virtually generated robotic program through a robotic software simulation application, any script containing a set of robotic instructions which describe the job of the robot, for example by listing its target locations, positions, motion instructions and commands.

3) Selecting predefined sampling times $t_i$. The sampling time interval is preferably picked to be large enough, above a certain threshold, e.g. circa a few hundred milli-seconds in order to avoid collecting an unnecessary large amount of data.

4) Executing the full simulation of the entire cell study with a robotic simulation application.

5) For each time interval, executing the following sub-steps:

5.1) During simulation, collecting for each relevant object or resource of the cell study, its position data and/or its joint value data. Examples of position data include, but are not limited by, coordinates and orientation of the resource base frame e.g. $(X, Y, Z, R_X, R_Y, R_Z)$. For certain resources, i.e. the ones having a kinematic motion, e.g. like robots and turn tables, also joint value data are collected e.g. $(j1, \ldots, j6)$. Examples of relevant cell resources include, but are not limited by, robots, robotic guns, robotic gripper, product parts, conveyors, turn tables, any other industrial objects and equipment pieces in the proximity of each robot.

5.2) In case the new position data and/or joint value data of the resource hasn't changed, ignoring such data. In fact, if the position and the joint value of a resource is equal to the previous one, this means that the object or resource didn't move and therefore no unnecessary large amount of data needs to be collected. In embodiments, the ignoring step can be performed after or before a data collection step. Sketched Table 1 below is an example of collected data, for predefined time samples, on position data and/or joint value data for study resources like for example the various robots, various robotic guns and grippers and product parts.

TABLE 1

Exemplary table with collected position data and/or joint value data for study resources

| SIMULATED OBJECT/ RESOURCE | Pose 1 $t_1$ (0.5 sec) | Pose 2 $t_2$ (1 sec) | Pose 3 $t_3$ (1.5 sec) | Pose 4 $t_4$ (2 sec) | ... |
|---|---|---|---|---|---|
| ROBOT 1 | ... | ... | ... | ... | |
| ROBOT 2 | ... | $(X, Y, Z, R_X, R_Y, R_Z)$, $(j_1, \ldots, j_6)$ | | | |
| ROBOT 3 | ... | | | | |
| ... | ... | | | | |
| ROBOT 10 | ... | | | | |
| GUN A | ... | | | | |
| ... | ... | | | | |
| GUN Z | ... | | | | |
| GRIPPER A | ... | | | | |
| ... | ... | | | | |
| GRIPPER N | ... | | | | |
| PART A | ... | | | | |
| ... | ... | | | | |
| PART F | ... | ... | ... | ... | ... |

6) Stopping the simulation execution, when each robot concluded at least one iteration.

7) Analyzing the simulated objects with their corresponding collected data and generating robot relation groups.

7.1) A robot relation group is defined as a group of items with relevant resources or relevant industrial objects around a robot, including the robots itself and their relevant time stamps. Examples of relation group items include, but are not limited by, a robot, its tools, relevant equipment pieces, relevant product parts and corresponding period of time so as to define which robot worked with which tools, on which part, and on which period of time. For example, in Table 2 it is illustrated a robot relation group for "Robot 1" (times 5-10), "Gun F" (times 5-7), "Gun G" (times 7-10), "Part B" (times 5-10).

TABLE 2

Exemplary relation group table of Robot 1

| | TIMES FOR ROBOT 1 | | | | | |
|---|---|---|---|---|---|---|
| | 5 sec | 6 sec | 7 sec | 8 sec | 9 sec | 10 sec |
| TOOLS | Gun F | Gun F | Gun F | Gun G | Gun G | Gun G |
| PARTS | Part B | Part B | Part B | Part B | Part B | Part B |

The system detects automatically the "set of corresponding surrounding objects" and defines the robot relation group by extracting relevant information, for example information regarding objects like gun, gripper, conveyor, turn table, parts. In embodiments, a robot relation group may for example be defined by getting, from the robotic instruction set, information regarding which gun is to be used and when, and/or, for example, which rail or gripper is connected to the robot. In embodiments, given that usually target locations for robotic operations, e.g. like welding, lasering, spraying operations etc, are attached to the part and move with it; this information may preferably be used to infer which is the relevant part a specific robot is working on. In embodiments, a minimal distance around a robotic frame, robotic arm and/or robotic tool tip may be used to automatically define the object set to be considered as surrounding object set of a specific objects. In embodiments, information from OLP commands may be used as source of information to define one or more objects of a robot relation group, examples of such OLP commands include, but are not limited by, "Attach"\"Detach" for parts, "Mount"/"Unmount" for resources etc.

7.2) In case a robot relation group contains a repetitive robotic task, dropping such repetition. This is done in order to avoid collecting unnecessary large amount of data, when repetitively executing the same robotic loop. Advantageously, each robot completes only one cycle task for each job, and it is not executing several times the same cycle. In fact, in a full industrial simulation, until the manufacturing of one product is completed, it is often the case that several robots may be repeating their same own cycles several times, by repetitively executing their own industrial operation assigned to them. For example, until the manufacturing of one car is completed in a full simulation, Robot 5 may execute the same robotic task loop, e.g. by painting several roofs of several cars again and again. With embodiments, advantageously, repetitive actions of robots are dropped, and for each robot, only a single action is preferably recorded.

8) Going over each relation group:

8.1) Blanking all other objects and displaying only the relation's objects.

8.2) Reallocating the virtual camera at an appropriate place so that the corresponding point of view is able to optimally catch the robot industrial actions performed on the part together with corresponding relation group objects. For example, in embodiments, a virtual camera is allocated close and in front of the part, at a level of a human eye view or of an upper view.

8.3) In the robotic simulation application, umping the relation group objects including the robot, to their stored positions, and record the virtual camera view in the relevant robot area into a short movie or animation.

The result consists in a set of preview videos 311, 312, . . . , 320 for each selected robot 301, 302, . . . , 310 and corresponding relation group object set. Advantageously, to obtain the set of the preview videos 311, 312, . . . , 320, the full simulation needs to be executed only once.

In computer terminology, the term "file preview" refers to a view of a file content which may not show the full content of the file, but which may still prove useful and interesting for the final user.

As used herein, the term "preview video" refers to an on-screen animation view of a certain content as it will look when executed. In embodiments, the preview video specifically refers to an "efficient" animated display of a robot's task with its industrial group objects.

Figure 4:
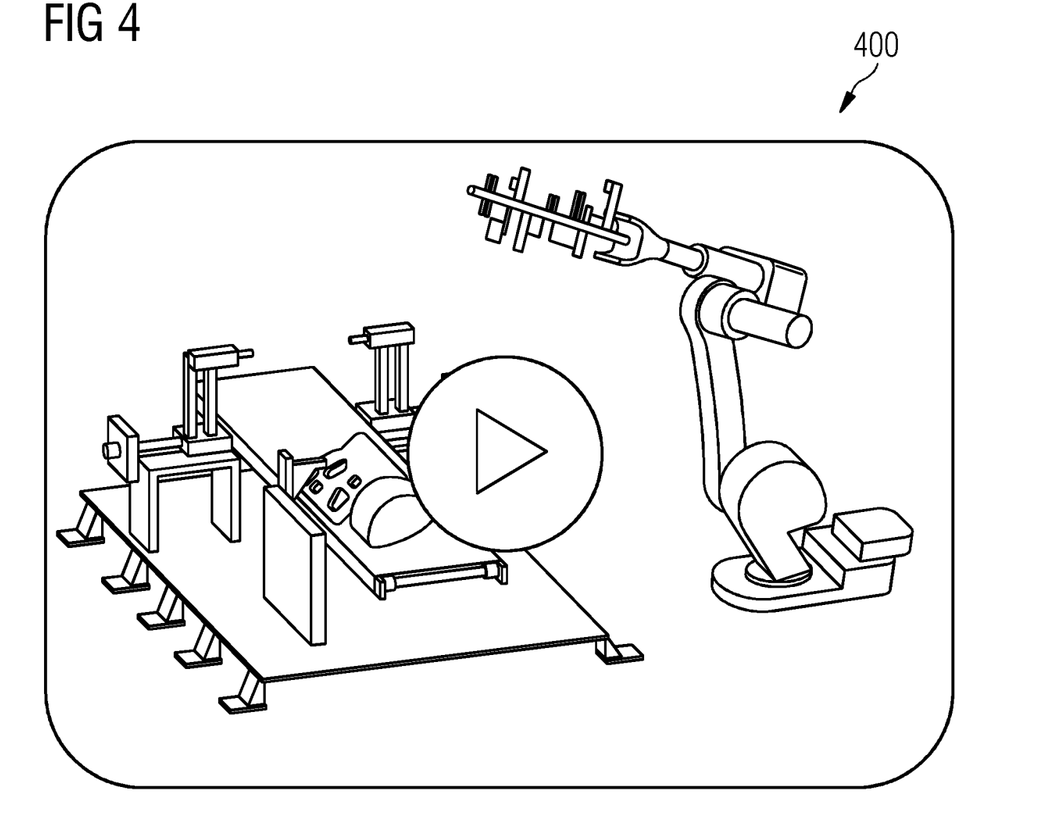
FIG. 4 is a drawing schematically illustrating a screenshot of an exemplary preview video in accordance with disclosed embodiments.

FIG. 4 is a drawing schematically illustrating a screenshot of an exemplary preview video in accordance with disclosed embodiments. In the screenshot of the preview video 400, it is shown a clean view of a robot with the corresponding relation group objects in its portion of virtual environment.

In embodiments, the preview video 400, 401, . . . , 410 may preferably have one or more of the following characteristics:

the video contains one single cycle only;
the video contains only the robot with its relevant objects of the same relation group;
the video is taken with an appropriate virtual camera point of view for optimally displaying for the robot's activity;
the video does not contain the idle times of the robot;
the video time is short and the video file is light;
the video file format is a standard one.

In embodiments, the preview video includes also non robotic equipment which cannot be emulated at all in a robotic controller.

In embodiment, the preview video is a short demo movie, dynamically and visually emulating the robotic task.

In embodiments, a repository may comprise robotic program files with associated corresponding preview video files.

In embodiments, the single recorded action of one robot may repetitively be displayed a plurality of times in the preview video for improving its intelligibility while still maintaining a light video file.

Assume an industrial facility cell with 10 robots and 10 robotic program files like the one illustrated in FIG. 3. With the embodiments, any industrial user is easily and efficiently enabled to understand a robotic file program and/or to recognize what the job of each robot is, preferably including its corresponding robotic tools, its product part and its other surrounding equipment, such as e.g. conveyors and turn tables.

In the exemplary embodiments disclosed in FIG. 3, to each robot 301, 302, . . . , 310 is associated only one robotic task/robotic program file and therefore only one corresponding resulting preview video 311, 312, . . . , 320. The skilled in the art easily appreciates, that in other embodiments, a plurality of robotic task/robotic program files may be associated to a single robot and therefore a plurality of preview videos may be contemplated for a single robot.

In embodiments, the generated preview video may advantageously be exported, as desired, in any convenient video format. Examples of video formats include, but are not limited by, formats like AVI, WMV, MOV, MKV, MP4 etc. Another video format example includes the COLLAborative Design Activity ("COLLADA") schema, an interchange file format for interactive 3D visualization for industrial data, in ISO/PAS 17506.

In embodiments, the generated video preview is preferably exported as a "disconnected" animation mode which conveniently does not require to be executed by a simulation application.

In embodiments, the video preview can be displayed on any edge device on any physical robots at the shop floor or on any other platform or device like e.g. a laptop, tablet or smartphone at the shop-floor or at the office.

In embodiments, the video preview can advantageously be displayed on any edge device or on any platform at the shop floor, for example in COLLADA schema an ISO format.

In embodiments, the video preview displays dynamic interactions between the robot and its surrounding pieces of equipment and product parts in its portion of robotic cell.

Embodiments include one or more of the following steps: starting a virtual simulation application, loading robotic instructions, executing a simulation, generating a general table with position data, defining relation group sub-tables, generating for each robot a preview video.

Table 3 is a comparison table summarizing some of the benefits of a robotic program preview video according to embodiments versus the drawbacks a robotic program source code file according to some prior art techniques.

described above, but the "system" in the process below can be any apparatus configured to perform a process as described.

A virtual environment comprises a plurality of robots and a corresponding plurality of industrial object sets.

Figure 5:
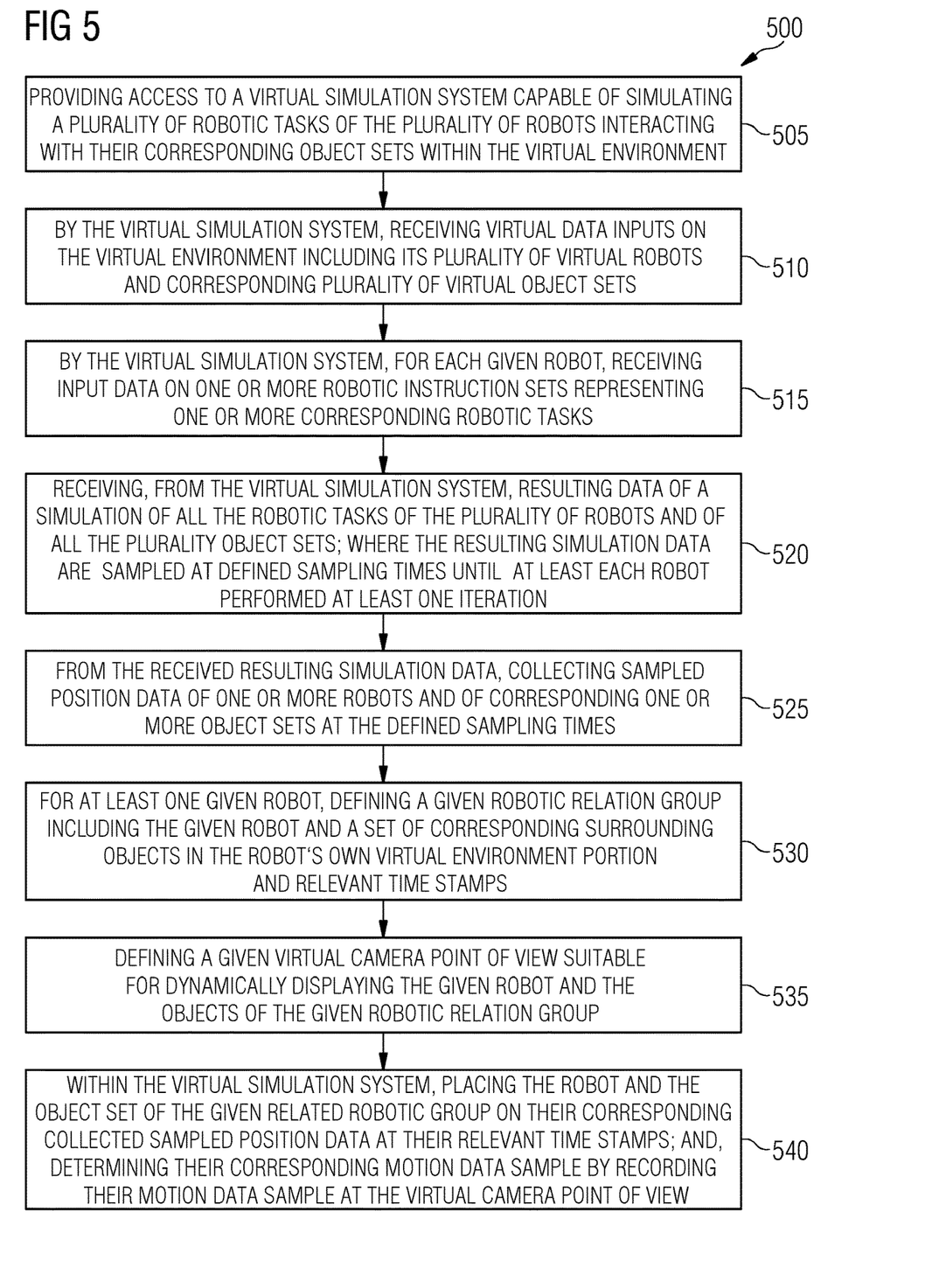
FIG. 5 illustrates a flowchart for automatically determining a motion data sample of a given robot in accordance with disclosed embodiments.

At act 505, it is provided access to a virtual simulation system capable of simulating a plurality of robotic tasks of the plurality of robots interacting with their corresponding object sets within the virtual environment.

At act 510, the virtual simulation system receives virtual data inputs on the virtual environment including its plurality of virtual robots and corresponding plurality of virtual object sets.

At act 515, the virtual simulation system receives, for each given robot, input data on one or more robotic instruction sets representing one or more corresponding robotic tasks. In embodiments, a source of robotic instruction sets may be a physical robotic program file or a virtually generated robotic program file.

At act 520, it is received, from the virtual simulation system, resulting data of a simulation of all the robotic tasks of the plurality of robots and of all the plurality object sets; where the resulting simulation data are sampled at defined sampling times $t_i$ until at least each robot performed at least one iteration.

At act 525, from the received resulting simulation data, it is collected sampled position data of one or more robots and of corresponding one or more object sets at the defined sampling times $t_i$. In embodiments, position data may preferably comprise position and orientation of base of the robot and the object and joint values of the robot, and where relevant, of the object.

At act 530, for at least one given robot, a given robotic relation group is defined including the given robot and a set

TABLE 3

Comparison table of "robotic program preview video" vs "robotic program source code file".

| | ROBOTIC PROGRAM PREVIEW VIDEO (ACCORDING TO EMBODIMENTS) | ROBOTIC PROGRAM SOURCE CODE FILE (PRIOR ART) |
|---|---|---|
| CONTENT | The preview video, beside dynamically displaying the robotic motion while executing its robotic task, it also displays the robotic tools and the equipment pieces in the robot's proximity (e.g. robotic gun, robotic gripper, conveyor, product part etc.) | The source code file mainly contains only data on robotic target locations and on robotic task instructions. |
| READABILITY | The preview video is a 3D dynamic display. | The source code file contains a long list of alphanumeric data, mainly relating to the 3D coordinates of robotic targets and to the robotic instruction commands. |
| COMPLEXITY | low | high |
| REQUIRED DURATION OF ANALYSIS | short | long |

FIG. 5 illustrates a flowchart 500 of a method for automatically determining, by a data processing system, a motion data sample of a given robot and its surrounding object set for dynamically displaying a robotic task of the given robot within its portion of a virtual environment in accordance with disclosed embodiments. Such method can be performed, for example, by system 100 of FIG. 1 of corresponding surrounding objects in the robot's own virtual environment portion and relevant time stamps. In embodiments, repetitive actions within a robot relation group may preferably not be considered.

At act 535, it is defined a given virtual camera point of view suitable for dynamically displaying the given robot and the object set of the given robotic relation group.

At act 540, within the virtual simulation system, the given robot and the object set of the given related robotic group are placed on their corresponding collected sampled position data at their relevant time stamps; and, their corresponding motion data sample is determined by recording their motion data sample at the virtual camera point of view. In embodiments, from the recorded motion data sample a preview video may preferably be generated with a predefined video format.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for automatically determining, by a data processing system, a motion data sample of a given robot and its surrounding object set for dynamically displaying a robotic task of the given robot within its portion of a virtual environment, the virtual environment including a plurality of robots and a corresponding plurality of industrial object sets, the method comprising:
    a) providing access to a virtual simulation system capable of simulating a plurality of robotic tasks of the plurality of robots interacting with their corresponding object sets within the virtual environment;
    b) using the virtual simulation system to receive virtual data inputs on the virtual environment including its plurality of virtual robots and corresponding plurality of virtual object sets;
    c) using the virtual simulation system, for each given robot, to receive input data on one or more robotic instruction sets representing one or more corresponding robotic tasks;
    d) receiving, from the virtual simulation system, resulting data of a simulation of all of the robotic tasks of the plurality of robots and of all of the plurality object sets, the resulting simulation data being sampled at defined sampling times until each robot has performed at least one iteration;
    e) collecting, from the received resulting simulation data, sampled position data of one or more robots and of one or more corresponding object sets at the defined sampling times;
    f) for at least one given robot, defining a given robotic relation group including the given robot and a set of corresponding surrounding objects in the robot's own virtual environment portion and relevant time stamps, with repetitive actions within the robotic relation group not being considered and objects not belonging to the robotic relation group being blanked;
    g) defining a given virtual camera point of view suitable for dynamically displaying the given robot and the object set of the given robotic relation group;
    h) within the virtual simulation system, placing the given robot and the object set of the given related robotic group on their corresponding collected sampled position data at their relevant time stamps, and determining their corresponding motion data sample by recording their motion data sample at the virtual camera point of view; and
    i) generating, from the recorded motion data sample, a preview video with a predefined video format exportable as a disconnected animation mode that does not require execution by a simulation application to assist in understanding the functionality of a robotic program associated to a physical robot at the shopfloor.

2. The method according to claim 1, which further comprises providing a source of robotic instruction sets as a physical robotic program file or a virtually generated robotic program file.

3. The method according to claim 1, which further comprises including, in the position data, position and orientation of a base of the robot and the object and joint values of the robot, and where relevant, of the object.

4. A data processing system, comprising:
    a processor; and
    an accessible memory;
    the data processing system configured to:
    a) provide access to a virtual simulation system capable of simulating a plurality of robotic tasks of a plurality of robots interacting with corresponding object sets within a virtual environment;
    b) use the virtual simulation system to receive virtual data inputs on the virtual environment including its plurality of virtual robots and corresponding plurality of virtual object sets;
    c) use the virtual simulation system, for each given robot, to receive input data on one or more robotic instruction sets representing one or more corresponding robotic tasks;
    d) receive, from the virtual simulation system, resulting data of a simulation of all of the robotic tasks of the plurality of robots and of all of the plurality object sets, the resulting simulation data being sampled at defined sampling times until each robot has performed at least one iteration;

e) collect, from the received resulting simulation data, sampled position data of one or more robots and of one or more corresponding object sets at the defined sampling times;

f) for at least one given robot, define a given robotic relation group including the given robot and a set of corresponding surrounding objects in the robot's own virtual environment portion and relevant time stamps, with repetitive actions within the robotic relation group not being considered and objects not belonging to the robotic relation group being blanked;

g) define a given virtual camera point of view suitable for dynamically displaying the given robot and the object set of the given robotic relation group;

h) within the virtual simulation system, place the given robot and the object set of the given related robotic group on their corresponding collected sampled position data at their relevant time stamps, and determine their corresponding motion data sample by recording their motion data sample at the virtual camera point of view; and i) generate, from the recorded motion data sample, a preview video with a predefined video format exportable as a disconnected animation mode that does not require execution by a simulation application to assist in understanding the functionality of a robotic program associated to a physical robot at the shopfloor.

5. The data processing system according to claim 4, which further comprises a source of robotic instruction sets being a physical robotic program file or a virtually generated robotic program file.

6. The data processing system according to claim 4, wherein the position data include position and orientation of a base of the robot and of the object and joint values of the robot, and where relevant, of the object.

7. A non-transitory computer-readable medium encoded with executable instructions that, when executed, cause one or more data processing systems to:

a) provide access to a virtual simulation system capable of simulating a plurality of robotic tasks of a plurality of robots interacting with corresponding object sets within a virtual environment;

b) use the virtual simulation system to receive virtual data inputs on the virtual environment including its plurality of virtual robots and corresponding plurality of virtual object sets;

c) use the virtual simulation system, for each given robot, to receive input data on one or more robotic instruction sets representing one or more corresponding robotic tasks;

d) receive, from the virtual simulation system, resulting data of a simulation of all of the robotic tasks of the plurality of robots and of all of the plurality object sets, the resulting simulation data being sampled at defined sampling times until each robot has performed at least one iteration;

e) collect, from the received resulting simulation data, sampled position data of one or more robots and of one or more corresponding object sets at the defined sampling times;

f) for at least one given robot, define a given robotic relation group including the given robot and a set of corresponding surrounding objects in the robot's own virtual environment portion and relevant time stamps, with repetitive actions within the robotic relation group not being considered and objects not belonging to the robotic relation group being blanked;

g) define a given virtual camera point of view suitable for dynamically displaying the given robot and the object set of the given robotic relation group;

h) within the virtual simulation system, place the given robot and the object set of the given related robotic group on their corresponding collected sampled position data at their relevant time stamps, and determine their corresponding motion data sample by recording their motion data sample at the virtual camera point of view; and i) generate, from the recorded motion data sample, a preview video with a predefined video format exportable as a disconnected animation mode that does not require execution by a simulation application to assist in understanding the functionality of a robotic program associated to a physical robot at the shopfloor.

8. The non-transitory computer-readable medium according to claim 7, wherein a source of robotic instruction sets is a physical robotic program file or a virtually generated robotic program file.

9. The non-transitory computer-readable medium according to claim 7, wherein the position data include position and orientation of a base of the robot and of the object and joint values of the robot, and where relevant, of the object.

* * * * *